US012644698B2

(12) United States Patent      (10) Patent No.:   US 12,644,698 B2

Böhm      (45) Date of Patent:     Jun. 2, 2026

(54) THZ MEASUREMENT METHOD AND THZ MEASUREMENT DEVICE FOR SURVEYING A MEASUREMENT OBJECT, IN PARTICULAR A PIPE

(71) Applicant: CITEX HOLDING GMBH, Melle (DE)

(72) Inventor: Roland Böhm, Altenberge (DE)

(73) Assignee: CITEX HOLDING GMBH, Melle (DE)

( * ) Notice: Subject to any disclaimer, the term of this patent is extended or adjusted under 35 U.S.C. 154(b) by 483 days.

(21) Appl. No.: 18/011,235

(22) PCT Filed: Jun. 25, 2021

(86) PCT No.: PCT/DE2021/100541

§ 371 (c)(1),
(2) Date: Dec. 19, 2022

(87) PCT Pub. No.: WO2021/259426

PCT Pub. Date: Dec. 30, 2021

(65) Prior Publication Data

US 2023/0251083 A1     Aug. 10, 2023

(30) Foreign Application Priority Data

Jun. 25, 2020    (DE) ..................... 10 2020 116 810.1

(51) Int. Cl.
    G01B 15/02       (2006.01)
    B29C 48/92       (2019.01)
           (Continued)

(52) U.S. Cl.
    CPC .............. G01B 15/02 (2013.01); B29C 48/92 (2019.02); B29C 48/09 (2019.02);
           (Continued)

(58) Field of Classification Search
    CPC ......... G01B 15/02; G01B 11/06; B29C 48/92; B29C 48/09; B29C 2948/92152;
           (Continued)

(56) References Cited

U.S. PATENT DOCUMENTS

| | | | | | |
|---|---|---|---|---|---|
| 4,304,995 A | * | 12/1981 | Huttunen | ........... | G01N 21/9072 |
| | | | | | 250/341.1 |
| 5,138,322 A | * | 8/1992 | Nuttall | ............... | A63B 71/0605 |
| | | | | | 342/126 |

(Continued)

FOREIGN PATENT DOCUMENTS

| | | |
|---|---|---|
| DE | 10360889 A1 | 7/2005 |
| DE | 102016105599 | 10/2017 |

(Continued)

OTHER PUBLICATIONS

Alois Krischke DJ0TR, Rothammels Antennenbuch; 13th Edition, 2013, DARC Verlag GmbH, 6 pages, (English machine translation included).

(Continued)

*Primary Examiner* — Vladimir Magloire
*Assistant Examiner* — Ashley Brown Raynal
(74) *Attorney, Agent, or Firm* — Barnes & Thornburg LLP

(57)          ABSTRACT

The invention relates to a THz measuring method for measuring a measured object (6), for example, a pipe made of a plastics or rubber, comprising
   a calibrating step for measuring an empty time of flight of at least one THz transmission beam through an empty path between a first measuring position (MP1) and a second measuring position (MP2) of a measuring region (4) without the measured object (6) and determining the empty path (s0), (Continued)

Figures 1, 2, 3:
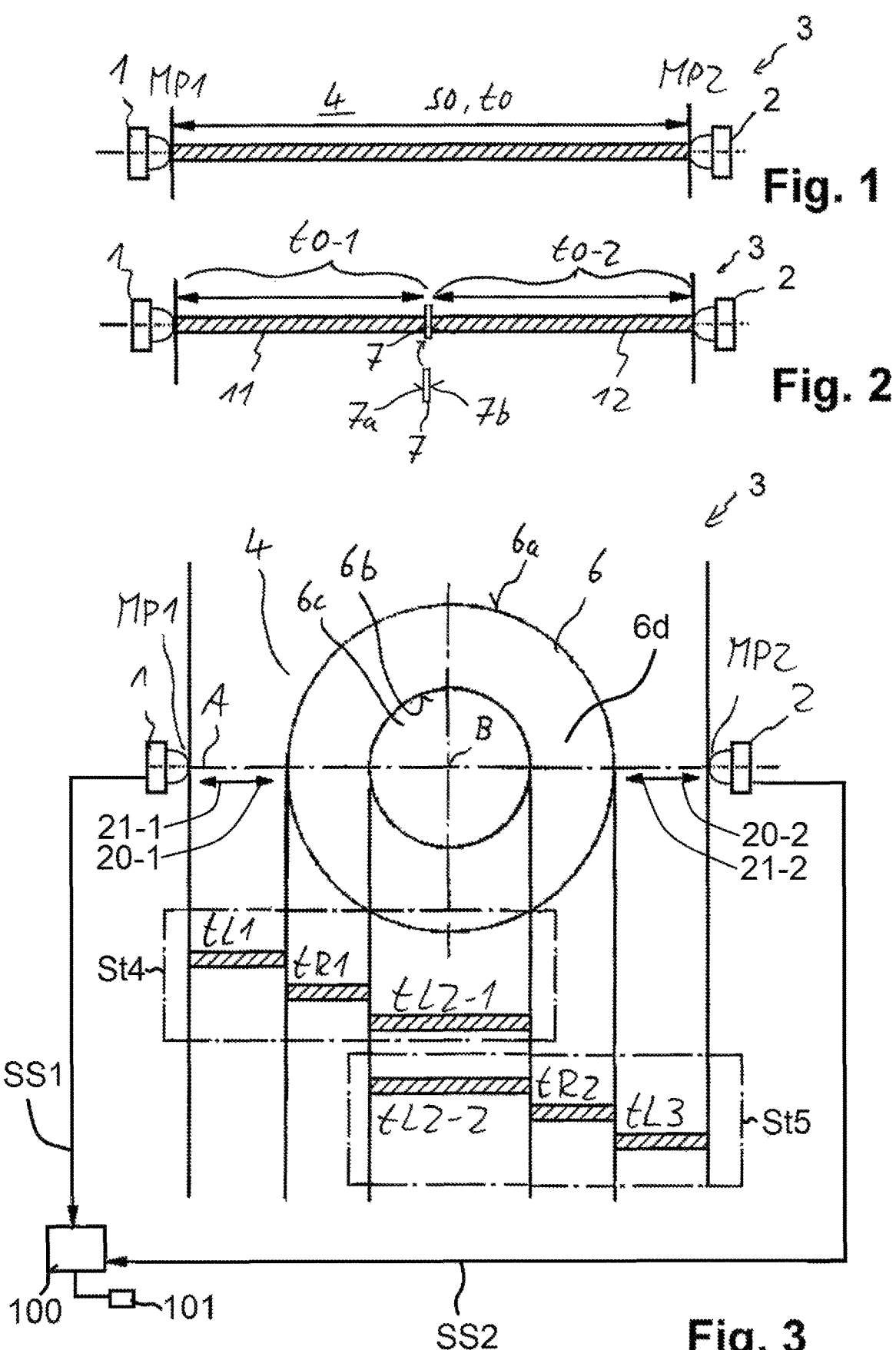

positioning a measured object (6) in the measuring region (4) between measuring positions (MP1, MP2), carrying out a first THz-measurement from the first measuring position (MP1) using a THz transmission beam (20-1) along a first optical axis (A) while measuring a first exterior time of flight (tL1) up to an exterior surface (6a) of the measured object (6), a first wall time of flight (tR1) through a first wall region of the measured object (6) and an interior time of flight (tL2, tL2_1) through an interior space (6c) of the measured object, carrying out a second THz-measurement from the second measuring position (MP1) along a second optical axis (A) while measuring a second exterior time of flight (tL3) between the second measuring position (MP2) and the exterior surface (6a) of the measured object (6) and a second wall time of flight (tR2) through a second wall region of the measured object (6)

determining a total time of flight (tges_R) through the measuring region (4) with the measured object, and determining a first wall thickness (sR1) of the first wall region and a second wall thickness (sR2) of the second wall region from the measured times of flight (St7).

27 Claims, 5 Drawing Sheets

(51) Int. Cl.
B29C 48/09 (2019.01)
B29L 23/00 (2006.01)
(52) U.S. Cl.
CPC ............... *B29C 2948/92152* (2019.02); *B29C 2948/92447* (2019.02); *B29L 2023/22* (2013.01)

(58) Field of Classification Search
CPC . B29C 2948/92447; B29C 2948/92114; B29C 2948/92247; B29C 2948/926; B29L 2023/22; G01N 21/952
See application file for complete search history.

(56) References Cited

U.S. PATENT DOCUMENTS

| | | | | |
|---|---|---|---|---|
| 5,760,413 A * | 6/1998 | Kurachi | ................ | G01B 11/06 |
| | | | | 250/223 R |
| 2019/0107485 A1* | 4/2019 | Thiel | ...................... | G01B 11/24 |

FOREIGN PATENT DOCUMENTS

| | | | | |
|---|---|---|---|---|
| DE | 102016105599 A1 | 10/2017 | | |
| DE | 202016008526 | 5/2018 | | |
| DE | 202016008526 U1 | 5/2018 | | |
| DE | 102018124175 | 4/2020 | | |
| DE | 102018124175 A1 | 4/2020 | | |
| DE | 102018128248 | 5/2020 | | |
| DE | 102018128248 A1 * | 5/2020 | ............ | B29C 48/92 |
| EP | 0611969 A1 * | 8/1994 | .......... | G01S 13/931 |
| EP | 2486392 A1 | 8/2012 | | |
| EP | 3347723 B1 | 12/2021 | | |
| WO | 9304382 A1 | 3/1993 | | |
| WO | WO-2016139155 A1 * | 9/2016 | ......... | G01N 21/3581 |
| WO | WO-2017215712 A1 * | 12/2017 | ............ | G01B 11/06 |

OTHER PUBLICATIONS

International Search Report and Written Opinion for PCT/DE2021/100541 dated Sep. 30, 2021.

German Office Action issued for DE 102020116810.1.

\* cited by examiner

THZ MEASUREMENT METHOD AND THZ MEASUREMENT DEVICE FOR SURVEYING A MEASUREMENT OBJECT, IN PARTICULAR A PIPE

CROSS REFERENCE TO RELATED APPLICATIONS

This application is a U.S. national stage application under 35 U.S.C. § 371 (b) of International Application No. PCT/DE2021/100541 filed Jun. 25, 2021, which claims priority to the German Patent Application No. 10 2020 116 810.1 filed on Jun. 25, 2020, the disclosures of both of which are hereby expressly incorporated by reference in their entirety.

The invention relates to a THz measuring method and a THz measuring device for measuring of an object, in particular, a pipe made of a plastic or rubber material.

THz measuring methods and measuring devices may be utilized, in particular, for measuring continuous profiles, in particular, of single or multi-layer pipe profiles made of a material permeable to THz radiation such as plastics or rubber. The THz radiation is partially reflected at boundary surfaces of materials of differing refraction indexes, in particular, at exterior surfaces and interior surfaces of a pipe profile, and reflected back towards the transmitting THz sensor so that times of flight of the THz measuring signal can be determined. Based on the known speed of light in air or vacuum, the times of flight can be directly associated with lengths of run and thereby distances; likewise, in plastic material, provided its refraction index is known, it is also possible to associate a time of flight and thereby a distance.

For measuring pipes, in particular, two basic methods are known:

In the case of a one-sided measurement radially through a pipe against an opposite reflector one or more sensors each having an opposite mirror or reflector are arranged, e.g. rotationally, around a pipe. From the known empty time of flight within the measuring device and the times of flight of the reflection measuring signals reflection peaks occurring due to reflection at the pipe or the exterior surface or interior surface thereof, it is possible to determine time of flight differences and, from these, wall thicknesses by means of the refraction index.

Hereby, deviations in shape of the pipe to be measured may prevent analyzable back reflections, in particular, in the region of the second wall thickness of the pipes. Further, it may be of disadvantage that, in the case of larger wall thicknesses or absorbing additives, the THz radiation will be absorbed to such an extent that the reflected signals are too weak to reliably evaluate them.

In the case of a simple single-sided measurement radially through the pipe wall, generally, several sensors are arranged, e.g., rotationally around a pipe, e.g. opposite one another. The THz sensors or THz transceivers emit a THz transmission beam along the optical axis radially through the pipe wall and measure reflected radiation or reflection peaks, from which the diameter of the pipe and the wall thicknesses of the pipe can be determined. Hereby, e.g., four or eight THz sensors may be used from the information of which the diameter can be calculated even e.g. in the case of a faulty position. Hereby, in order to securely calculate the wall thickness, it is required to know the materials or its refraction index, where the refraction index is determined by the ratio of the speed of light in the material to the speed of light in a vacuum (or air).

However, the refraction index generally depends on the material or even material charge and also on the temperature. Thus, for a correct measurement it is generally required to determine a reference refraction index from a material sample.

The document DE 20 2016 008 526 U1 describes a device for measuring the diameter and/or the wall thickness of a strand essentially circular in cross-section and guided through the device by means of guide means in the direction of its longitudinal axis. Hereby, a transmitter for emitting terahertz radiation with a radiation optics, and a reflector opposite the transmitter are provided, whereby an evaluation device is adapted to determine the diameter and/or the wall thickness of the strand based on the measuring signals.

The citation DE 10 2018 128 248 A1 describes a method for determining the refraction index of a pipe-shaped body irradiated by measuring radiation in a measuring region by a transmitter means, the radiation being reflected at its boundary surfaces and detected by a receiver means. Based on the reflected measuring radiation the optical wall thickness of a wall region is determined, and, subsequently, the refraction index is determined from a comparison of the exterior and interior diameter to the optical wall thickness.

The document DE 10 2018 124 175 A1 describes a method and a device for controlling a manufacturing installation for plate-shaped or strand-shaped bodies, wherein the body is transported along a transport direction through a measuring region and irradiated by measuring radiation which penetrated the body, at least in part, and measuring radiation reflected from the body is detected, whereby a refraction index is determined and/or an absorption of at least one manufacturing parameters of a manufacturing installation is determined.

Thus, the invention is based on the object of creating a THz measuring device and a THz measuring method allowing for a secure measuring of an object.

This task is solved by a THz measuring method and a THz measuring device according to the independent claims. The sub-claims describe preferred further developments.

The THz measuring device according to the invention may, in particular, be utilized in carrying out the THz measuring method according to the invention; the THz measuring method according to the invention may, in particular, be carried out by means of a THz measuring device according to the invention.

Thus, according to the invention, a measurement across a measuring region from two opposite measuring positions is provided. The measurements are carried out by a sensor arrangement including one or more sensors, the sensor arrangement carrying out the measurements from a first measuring position and from a second measuring position.

Hereby, according to a first embodiment, the sensor arrangement may comprise a pair of two opposite sensors, i.e. a first sensor at the first measuring position and a second sensor at the second measuring position, which thereby define between themselves an empty path in the empty measuring device, i.e. without a measured object contained therein.

According to a modified first embodiment, instead of the pair of two sensors, one sensor may successively be placed in the two measuring positions, i.e., guided around the measuring region, e.g. moved rotationally around the measuring region, which is tantamount to the measurements in the two measuring positions of the first embodiment.

The two sensors or the sensor adjusted successively into the two measuring positions may, for one thing, be provided with a fixed angle adjustment. Thus, in the embodiment involving two opposite sensors, these advantageously lie in a common optical axis. This design with sensors in a fixed arrangement is particularly advantageous if the measured object can subsequently be positioned exactly in the optical axis or in the empty path.

Alternatively, the sensors may also be received in their measuring positions in a pivotable manner thereby lying in an initial position in a common optical axis and being adjusted from this initial position each using an adjustment angle. Such pivotability may also be provided in the design having the rotationally adjustable sensor which is successively adjusted into the two measuring positions. This embodiment with pivoting sensors is particularly advantageous in the case of a subsequent measuring of measured objects with decentralized positioning wherein, consequentially, a center point of the measured object is potentially positioned outside the empty path so that the sensors in their initial position would transmit their THz transmission beams no longer perpendicularly onto the exterior surface of the measured object. Thus, by virtue of the pivotability the sensors can be swiveled away from the initial position after the calibration step.

According to a second embodiment alternative hereto, a sensor may be provided with an opposite measuring reflector, where the sensor may be designed, in particular, with rotational mobility about a center point of a partial circle to be scanned.

In a calibration measurement which may be carried out, in particular, already in the factory, at first an empty time of flight of the measuring signal through the empty path or between the two measuring positions is determined. In the second embodiment having a sensor and opposite measuring mirror an empty time of flight may be determined from a direct measurement, i.e. the determination of the total reflection measuring signals or peaks in the THz measuring signal, and the empty path or reference path may be determined using the known speed of light in air.

In the first embodiment involving two measuring positions, i.e. a pair of sensors or adjustment of the sensor into the two measuring positions, the calibration according to an embodiment may be carried out by a calibrating reflector temporarily introduced into the measuring region or the reference path, e.g. a precision sheet with exactly known thickness and two reflecting exterior surfaces, so that from both sides or both measuring positions each an empty passage partial time can be determined, and thereby, in particular, the double of the determined time of flight at both measuring positions, in particular, plus a path compensation of the reflector thickness, for determining the empty time of flight and the empty path or reference path can be used.

As an alternative to a calibrating reflector another calibrating object having a known thickness and e.g. totally or partially reflecting boundary surfaces may be introduced, e.g. a precision pipe made of e.g. plastics, which is partially reflective at its exterior surfaces so that the reflection peaks may be used in a manner known as such, with a known thickness between the reflective exterior surfaces. Hereby, in particular, a calibrating pipe is of advantage because, for one thing, no reflectors are required and all installed sensors can be calibrated using the common central calibrating pipe, in particular, in the case of a precisely rounded and exactly known calibrating pipe, e.g. made of plastics or ceramics.

Such calibration can even be done in-factory. Then, subsequently, to determine the wall thicknesses and e.g. also a total diameter of a profile, in particular a pipe profile, to be measured, measurements are carried out from both sides or a two-way measurement is carried out, i.e. from the first and second measuring position, e.g. from the left and from the right. Thus, the following is carried out:

a first measurement of a first exterior time of flight from the first measuring position, e.g. the first sensor, to an exterior surface of the measured object, a first wall time of flight through the next following wall region of the measured object to its interior space, and an exterior time of flight through the interior space, and, accordingly, a second measurement of the corresponding second exterior time of flight between the second measuring position and the exterior surface of the measured object, a second wall time of flight through a second wall region of the measured object and, possibly, also a further interior time of flight, e.g. as further measurement of the value of the interior time of flight already determined in the first measurement.

Thus, in the embodiment involving two opposite measuring positions, e.g. two sensors, two corresponding direct measurements of these times of flight can be carried out; thus, the interior time of flight of the THz transmission beam through the interior space, i.e. between the interior surfaces of the wall regions, can be carried out from at least the first measuring position; in the embodiment involving two opposite measuring positions, in particular. corresponding measurements may be carried out from both sides, with subsequent averaging of the so determined values.

Then, subsequently, a total time of flight can be determined from the determined times of flight, i.e. the two exterior times of flight, the two wall times of flight and the (directly measured or averaged) interior time of flight. Thus, subsequently, a difference of the total time of flight compared to the empty time of flight determined upon calibration can be determined so that this difference represents an additional material time of flight representing the total temporal delay caused by the material.

If during the first and second measurements it is ensured that the center point of the measured object lies in the empty path between the measuring positions, the two measurements can be carried out with the fixed sensors along the common optical axis thereby allowing for direct measuring of the two exterior times of flight, the two wall times of flight and the one or two interior times of flight.

If, however, in the first and second measurements the center point of the measured object may also lie decentralized, the embodiment involving the pivoting sensors allows for an initial alignment of the sensors by swiveling in the measurement plane so that the optical axes of the two sensors lie perpendicular in relation to the exterior surface of the measured object. Then, subsequently, the first and second measurements are carried out, whereby subsequently upon determining the times of flight it is taken into account that the exterior times of flight, i.e. the times of flight from the measuring positions to the exterior surface, are prolonged according to the adjustment angles; this will be compensated accordingly upon the determination.

Subsequently, this overall material induced temporal delay and the individual times of flight, in particular the wall times of flight, may be utilized for further calculation or determination, where the exterior times of flight and the interior time of flight already essentially correspond to the corresponding values of the calibration measurement so that the material induced overall temporal delay can be attributed to the wall regions. From this an equivalent air time of flight in the pipe wall region can then be determined which corresponds to the time of flight of the measuring signal in the unknown total path of the pipe walls, provided that these would have the same refraction index as the surrounding medium, i.e., air.

Because the empty time of flight and the empty path are known from the calibration, in accordance with the invention, a total wall thickness (sum of the thicknesses of the pipe walls) can be determined, without having to apply a material specific value such as the refraction index or the material specific speed of light.

Thus, it is possible to determine the total thickness of the pipe walls from the current measurement of the pipe and the prior calibration, from which the empty time of flight and empty path are known, as well as this determination of the quotients or ratios, without having to use the refraction index or the speed of light in the material as a value. Rather, irrespective of materials, by forming these ratios or quotients it is possible to determine the total path of the pipe walls directly from the measuring signals determined on the common optical axis as well as the calibration.

Subsequently, the individual wall thicknesses or pipe wall thicknesses can be determined as shares, and thereby also as absolute values of the wall thicknesses, from a proportional distribution or the ratio of the wall times of flight or from the previously determined equivalent pipe wall region.

The calibration can be carried out already in the factory and optionally repeated later so that subsequently a wall thickness can be determined from current time of flight measurements without knowing the refraction index or the speed of light in the material.

According to the invention, the additional expenditure required herefor is small; the calibration can be made in advance, and the subsequent measurements can be made without any relevant additional effort.

Hereby, a plurality of sensors, e.g. several pairs of sensors or several individual sensors may be provided, which are arranged around the measuring region, or also one reflector each opposite to a sensor, the reflector reflecting the THz transmission beam back to the sensor, or one or more sensors revolve, e.g., rotationally around the measuring region so as to attain complete measuring of a pipe wall, in particular, of a continuously passing pipe.

In the case of an arrangement made of a plurality of rotating sensors e.g. the achieved overlap of a measured object transported in a transport direction is improved compared to merely one rotating sensor so that e.g. a higher transport velocity is made possible. Furthermore, the speed of rotation can be lowered, thereby reducing the load.

Thus, by carrying out the measurement continuously during rotation it is possible for the THz transmission beam or the plurality of THz transmission beams to run helically (spirally) circumferentially along the exterior circumference of the measured object, in particular, with measurements overlapping or helical measuring tracks for a complete measuring of the measured object.

An essential advantage of the invention lies in the fact that the wall thicknesses can be determined, and, further, according to the total diameter of the pipe, without knowing the refraction index, which may vary depending on material charges and temperatures. Moreover, this also allows subsequent determination of the refraction index itself by the so determined wall thicknesses and the wall times of flight of the measuring signal. From this, the material quality can always be currently evaluated; thus, it is possible, e.g., from the consistency of the so determined refraction index, to verify or check that the material charge has not changed and the material mix is homogenous. This is of advantage, in particular, when measuring pipes, e.g., discharged from an extruder while feeding in granular materials or granulate from different raw materials, and which may contain, e.g., varying additive components. Hereby, it is possible, in particular, to measure a pipe after extrusion continuously in the measuring device, in particular, with a transport axis or axis of conveyance perpendicular through the measuring device or perpendicular to the optical axes of the sensors.

In the event that upon measuring field recording it would be impossible to conduct a precise evaluation of the time of flight for the interior diameter due to very strong deformations causing destructive reflections of the measuring signal, the wall thicknesses can be determined from the time of flight within the pipe walls with the last determined refraction index alone. Hereby, it can be initially assumed that the structure of the materials does not change to a relevant extent or essentially remains unchanged within very short periods of time, and thus a total wall thickness can be determined from the measuring signal, from which then also the individual wall thicknesses are estimated, even when e.g., a measuring signal or measuring peak should be missing.

If, e.g., material accumulations are present only in one wall, then the temperature between the left and right wall may be different. This will change the refraction index as a material specific property. This can be output to the operator of the installation as additional information, since the measurement will not be unambiguously valid. Previously, methods generally assumed in a simplified manner that the refraction index remains constant within a cross sectional region of a homogeneous material.

In order to avoid, in the embodiment involving opposite sensors, mutual interference of the two sensor beams of the two opposite THz sensors, the transmission beams may e.g. be output in different frequency ranges and/or with temporal offset and/or e.g. in different polarity.

According to this invention, THz radiation shall be understood as terahertz radiation, radar radiation and/or microwave radiation. In particular, the frequency range may be between 5 GHz and 50 THz, e.g., 10 GHz and 5 THz, in particular, with fully electronic THz receivers, e.g., with direct time of flight measurement, frequency use and/or pulsed radiation.

Thus, where several source materials are used, by determining the refraction index, a conclusion can be inferred on a ratio of the material composition of the source materials, whereupon, e.g., the screw conveyors of the material feed may be controlled relative to one another, i.e., a regulation of the composition is carried out by measuring the refraction index and controlling the material feed, without requiring exact knowledge of the individual feed rates of the material feed.

Figures 4, 5:
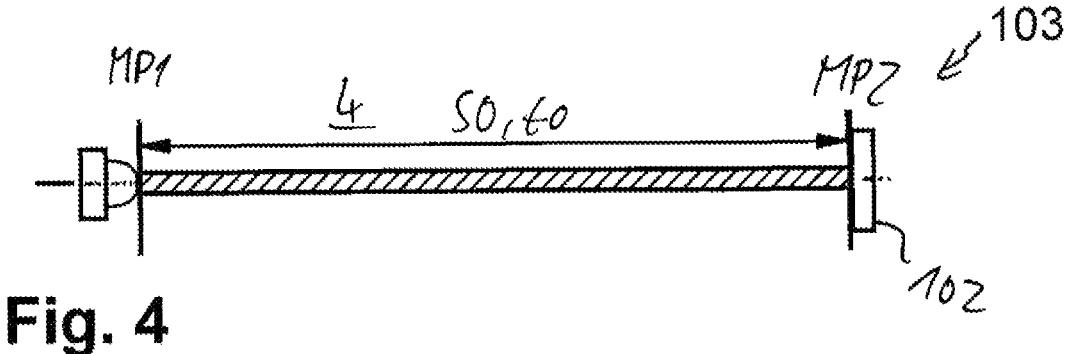
Figure 6:
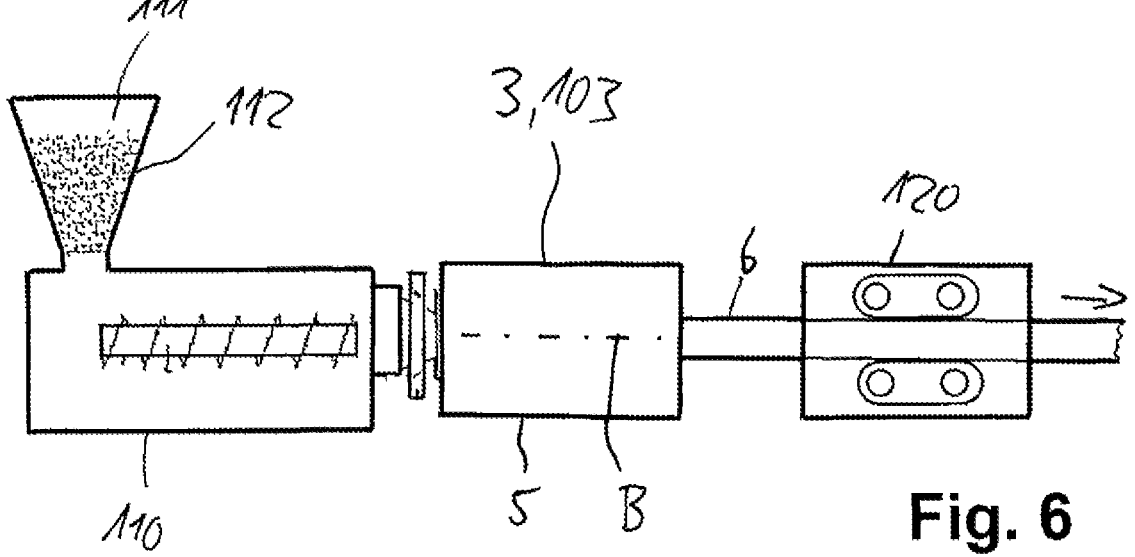
Figure 7:
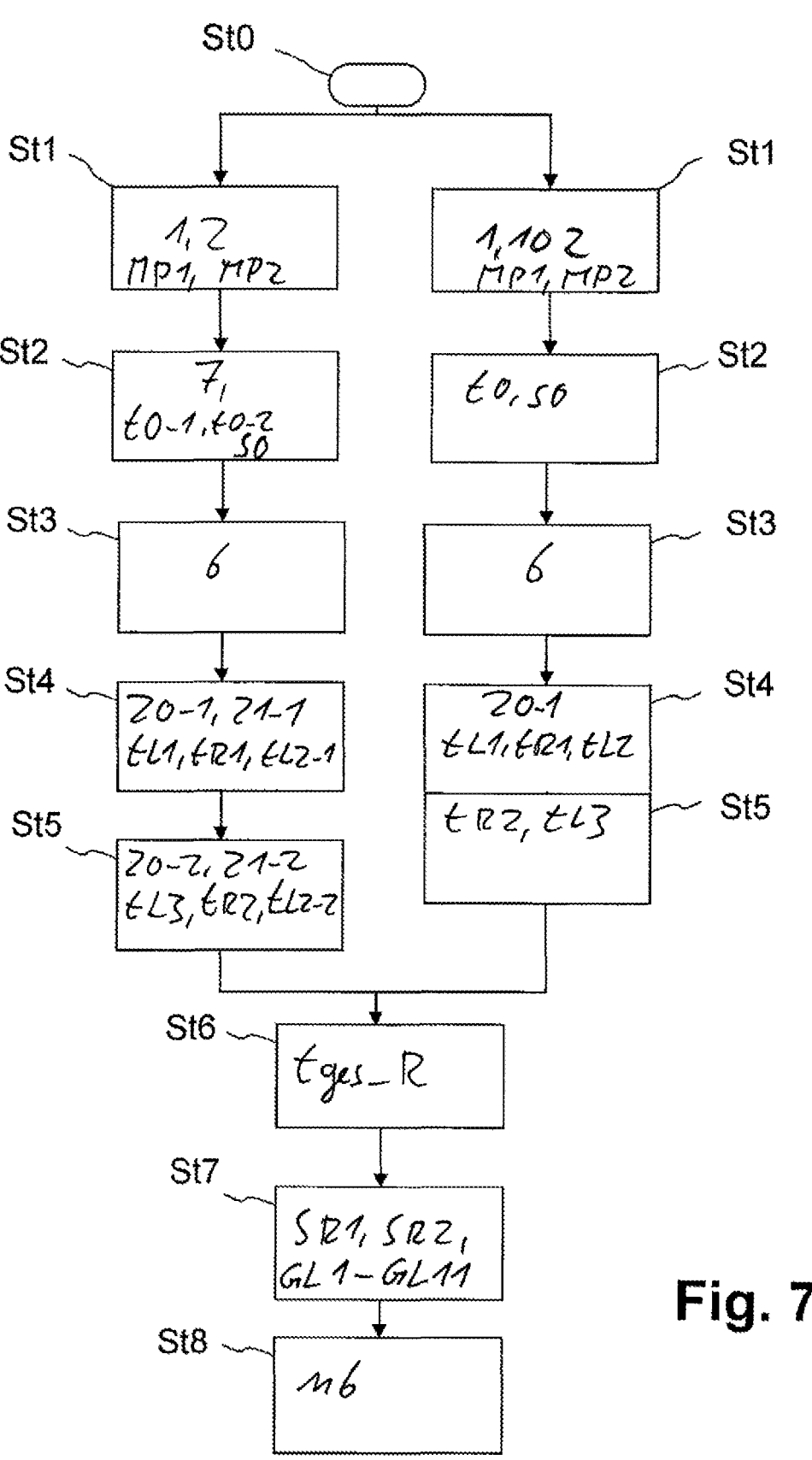
Figure 8:
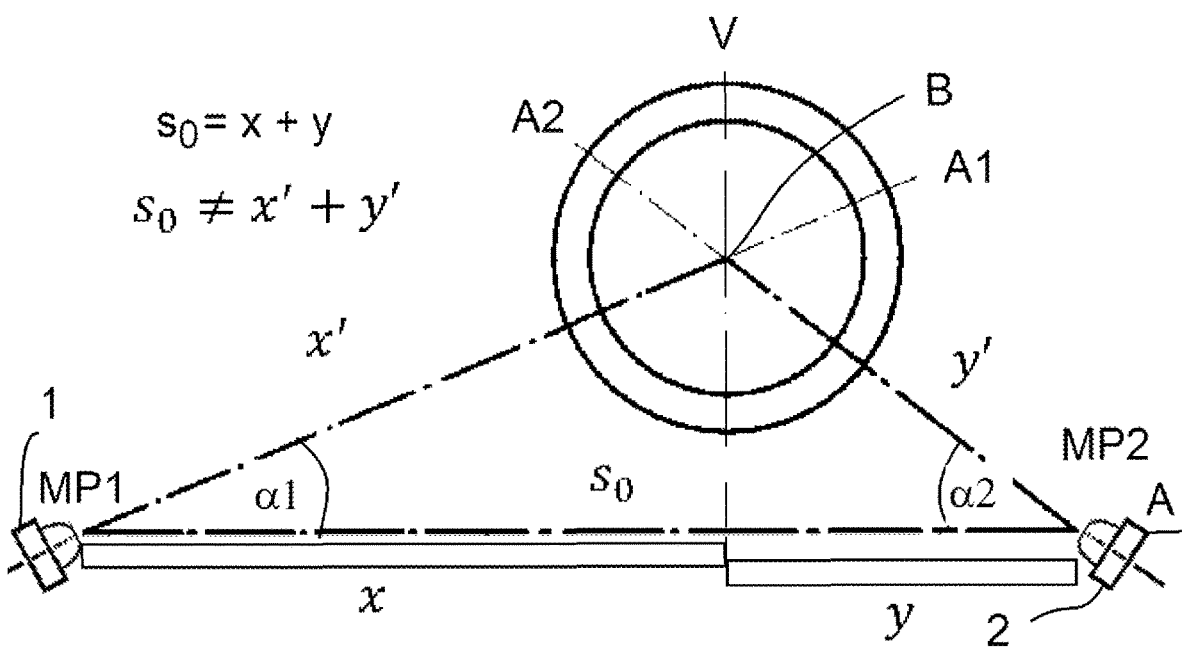

The invention is illustrated below by means of attached drawings in a few embodiments. It is shown in:

FIG. 1 a THz measuring device according to a first embodiment;

FIG. 2 the THz measuring device from FIG. 1 during calibration;

FIG. 3 the THz measuring device from FIG. 1,2 during subsequent measuring of a single wall pipe as the measured object;

FIG. 4 a THz measuring device according to a second embodiment during calibration (empty measurement);

FIG. 5 the THz measuring device from FIG. 4 during subsequent measuring of an object;

FIG. 6 an arrangement for manufacturing and measuring profiles and/or pipes using a THz measuring device in a lateral view;

FIG. 7 a flow chart of a THz measuring methods according to the two embodiments;

FIG. 8 a representation corresponding to FIG. 3 in an embodiment involving THz sensors pivoting in the measuring plane and decentral measured object.

Figure 9:
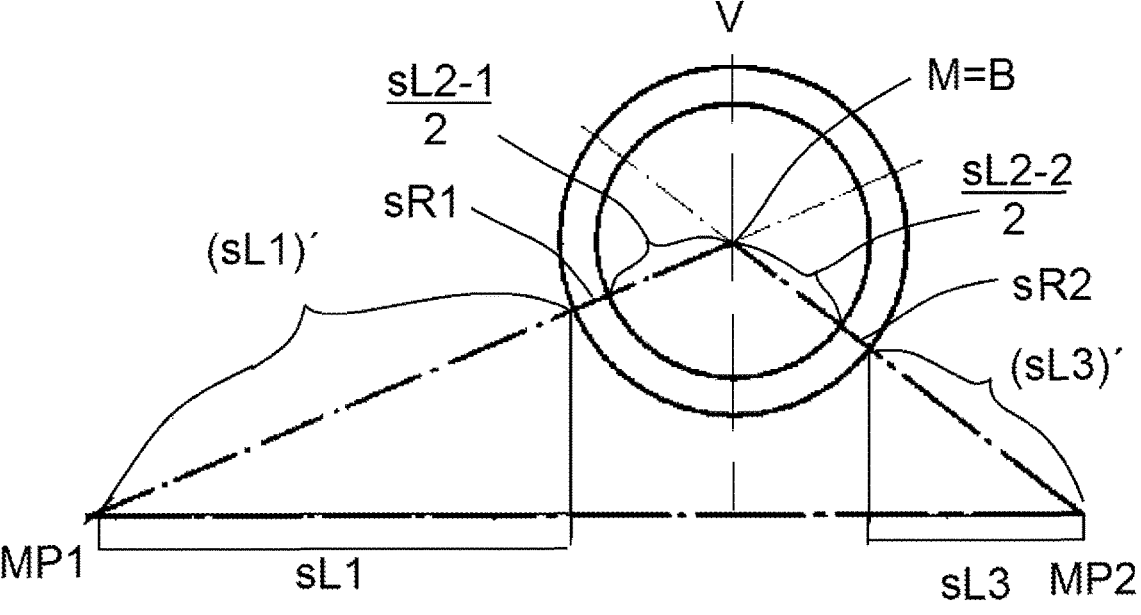

FIG. 9 the subsequent determination of the partial paths according to FIG. 8, for correcting the inclined position in relation to FIG. 3

According to the embodiment of the FIGS. 1 through 3, a THz measuring device 3 comprises a first, in this case left, THz sensor 1 and a second, in this case right, THz sensor 2 defining in-between them a measuring region 4 with an empty path (empty distance, reference path) s0 of e.g. between 1 and 2 m. The two THz sensors 1, 2 are designed as THz transceivers, i.e. transmitter and receiver means, in particular, fully electronic with a THz receiver chip. The THz sensors 1, 2 are aligned on a common optical axis A in the measuring region 4; slight deviations from the common optical axis A are not relevant here as long as these settings are not changed subsequently. According to the lateral view of the FIG. 6. the THz-sensors 1, 2 may be received, in particular at a common, e.g., cylindrical housing 5 and aligned towards the measuring region 4 defined in-between them, which is open at the sides, in particular, for measuring continuous measured objects, in particular, pipes 6. Thus, according to FIG. 7, after the start in step St0 this measuring device 3 is formed in a preparatory step St1.

Subsequently a calibrating step St2 is carried out in which, in this embodiment, the empty path s0, i.e., the distance between the THz sensors 1, 2, and the empty time of flight t0 are calibrated as time of flight of the THz radiation in the empty path s0. To that end, a two-faced calibrating reflector 7 is positioned in the measuring region 4 perpendicular to the optical axis A so that its two lateral surfaces 7a, 7b are perpendicular to the optical axis A. As calibrating reflector 7 e.g., a precision sheet with exactly known thickness, e.g., s7=0,507 mm, can be utilized.

This is followed by the empty measurement or reference measurement, where the first THz sensor 1 emits a first THz calibrating beam 11 along the optical axis A and detects the THz radiation reflected from the reflector surface 7a, thereby providing a precise determination of the first (left) empty partial time t0-1, i.e. the time of flight across the distance or empty path segment s0-1 between the first sensor 1 and the first reflector surface 7a. Accordingly, the second THz sensor 2 emits a second THz calibrating beam 2 along the optical axis A into the measuring region 4 which is reflected from the second reflector surface 7b and again detected by the THz sensor 2 so that, correspondingly, the second empty partial time t0-2 is measured precisely, i.e. the time of flight across the second empty path segment s0-2 between the second sensor 2 and the second reflector surface 7b.

Hereby, the THz sensors 1, 2 send out THz radiation along the optical axis and detect reflected THz radiation, whereby they measure the corresponding times of flight t. Hereby, direct time of flight measurements may be carried out, in which reflection peaks are detected; accordingly, it is also possible to carry out measurements with frequency modulation, with corresponding evaluation in the frequency domain and conversion to corresponding times of flight.

The empty time of flight t0 for each of the THz sensors 1, 2, i.e., the time of flight of the THz radiation from each THz sensor 1, 2 via the empty path s0 to the other THz sensor 2, 1 then essentially corresponds to the double of the averaged empty partial time t0-1, t0-2 of both sensor measurement plus a path compensation of the reflector thickness s7, i.e., a path compensation s7/c0.

Due to the highly precisely known speed of light c0=299.792.458 m/s the empty time of flight t0 in a vacuum and accordingly in the air can be converted with high precision into an empty path s0, i.e., s0=t0\*c0.

Thus, alternatively, the empty path s0 may also be calculated directly from the empty partial time t0-1, t0-2 and the reflector thickness s7, i.e., s0=(t0-1+t0-2)\*c0+s7.

Following such calibration, the calibrating reflector 7 is preferably removed again so that, subsequently measurements of measured objects 6 can be carried out. After this calibration the THz sensors 1, 2 are no longer adjusted, or in the event of an adjustment a subsequent calibration is provided. Adjustments of the entire measuring device 1 relative to the measured object 6 do not affect the calibration. In principle, the calibrating reflector may even remain firmly installed.

Instead of a calibrating reflector 7 (whether temporary or firmly installed) a known and precisely measured calibrating object, e.g. a calibrating pipe with known dimensions, i.e., in particular, known reference thickness and/or layer thickness, e.g., made of plastics or e.g. ceramics, can be introduced in-between the measuring positions or in the embodiment involving two THz sensors in-between the two THz-sensors 1, 2, so that, then, from both measuring positions MP1, MP2 each an empty partial time t0-1, t0-2 up to boundary surfaces of the calibration object is measured, and, subsequently, the empty time of flight t0 and, preferably, the empty path s0 are determined from the so determined empty partial times t0-1, t0-2, the known speed of light c0 as well as the known reference thickness. This shall be described in more detail below. Thereafter, the calibration object can be removed.

According to FIG. 3, as measured object 6 a single wall pipe made of plastics or rubber is guided through the measuring region 4, in particular, with its transport axis B perpendicular to the optical axis A. Hereby, however, the lateral position of the measured object 6 is generally not specified, whereby the measured object 6 or even the measuring device 3 (without adjusting the sensors 1,2 in relation to one another) can be laterally adjusted in order to center the measured object 6.

Thus, from the calibration or empty path measurement of FIG. 1, 2, the empty time of flight t0 and the empty path s0 are known already, and these are subsequently used for calculations in measuring measured objects 6.

Thus, in the measuring arrangement according to FIG. 3, subsequently the measured object 6 is transported along the transport axis B through the THz measuring device 1 and continuously measured. Hereby, in a first measuring step St4 again the first THz sensor 1 sends a first THz transmission beam 20-1 along the optical axis A into the measuring region 4, i.e., essentially in the direction of the transport axis B, and detects first THz reflection beams 21-1.

Thus, the first THz transmission beam 20-1 runs from the first THz sensor 1 through a first exterior space (thus, here, the left exterior space) sL1 up to the exterior surface 6a of the pipe 6, with a measured first exterior time of flight tL1, then the first THz transmission beam 20-1 passes through the exterior surface 6a so that, accordingly, at time tL1 a first measuring peak is generated in the first THz reflection beam 21-1, Whereupon the first THz transmission beam 20-1 subsequently passes through the material of the pipe wall 6d with the refraction index n6. Hereby, the first THz transmission beam 20-1 transits the first wall region with a first wall thickness sR1 and, generates, after a first interior time of flight tR1, subsequently again a reflection peak upon passing through the interior surface 6b of the pipe 6;

then the first THz transmission beam 20-1 runs through the interior space 6c of the pipe 6, i.e. through the interior diameter sL2, until it again reaches the interior surface 6b, whereby a first interior time of flight tL2-1 is measured.

Thus, in this first measuring step the times of flight tL1, tR1, tL2-1 are measured; however, the refraction index n6 is still unknown so that the first interior time of flight tR1, too, cannot be converted directly into the first wall thickness sR1 initially.

Accordingly, in a second measuring step St5, the second THz transmission beam 20-2 is emitted from the second THz sensor 2 into the measuring region 4, whereby upon transiting the second (right) exterior space sL3 it puts out a measuring peak and enters the exterior surface 6a of the pipe 6 and, after transiting the second (right) wall region of the pipe 6 with a second wall thickness sR2, upon striking the interior surface 6b again generates a measuring peak as partial reflection which is detected in the second THz reflection beam 20-2 as measuring signal. Here, too, the second wall time of flight tR2 again cannot be converted directly into the second wall thickness sR2 because of the unknown refraction index n6. Subsequently, the second THz transmission beam 20-1, too, enters the interior space 6c, i.e., through a first wall thickness R1 with the time of flight tR1 of the pipe 6 thus putting out a measuring peak after transiting though the interior diameter L2 after the second interior time of flight tL2-2.

In FIG. 3, the so determined times of flight are shown, i.e., the first measuring signal SS1 contains the times of flight tL1, tR1 and tL2-1, and, accordingly, the second measuring signal SS2 the times of flight t-L3, tR2 and tL2-2. These measuring signals SS1 and SS2 are received by a controller and evaluation means 100 which can store the calibration values e.g., in an internal or external memory 101.

Thus, here, advantageously, the interior times of flight tL2-1, tL2-2 are determined by both THz sensors 1, 2 which should be equal provided that the measurements are correct; this can be used to validate the measuring result. In the event of deviations due to measuring inaccuracies it is possible to later preferably use the average as the interior time of flight tL2. However, in principle, it is sufficient to determine the interior time of flight only of one side.

Subsequently, in step St6, now the total time of flight tges_R is determined according to Equation GL1:

$$tges\_R = tL1 + tR1 + tL2 + tR2 + tL3 \qquad (GL\ 1).$$

A material time of flight difference Δt compared to the empty time of flight to equals:

$$\Delta t = tges\_R - t0 \qquad \text{Equation GL2.}$$

Thus, subsequently, an equation can be used in which the total time of flight tges_R according to equation GL1 with the pipe 6 to be measured with equivalent times of flight can be expressed, i.e., a first (left) equivalent time of flight tRLA1, and, accordingly, a second equivalent time of flight tRLA2, whereby these equivalent times of flight correspond to a pure air path, plus the time of flight difference Δt:

$$tges\_R = tL1 + tRLA1 + tL2 + tRLA2 + tL3 + \Delta t \qquad \text{Equation GL3.}$$

This total time of flight tges_R of Equation GL3 can now be equated with the corresponding value of the total time of flight tges-R from Equation GL1:

$$tL1 + tR1 + tL2 + tR2 + tL3 = tL1 + tRLA1 + tL2 + tRLA2 + tL3 + \Delta t \qquad \text{Equation GL4.}$$

after reducing equal summands tL1, L2, tL3 which ultimately happen in the calibration measurement and the measuring steps always in air and are therefore equal, what follows is $$tR1 + tR2 = tRLA1 + tRLA2 + \Delta t \qquad \text{Equation GL4a}$$

Transposing to tRLA1+tRLA2 results in $$tRLA1 + tRLA2 = tR1 + tR2 - \Delta t \qquad \text{Equation GL4b:}$$

and, therewith, summarized, according to the equivalent total air time of flight tRLA1,2 in the pipe wall region, representing the sum of the two equivalent times of flight, i.e., tRLA1,2=tRLA1+tRLA2:

$$RLA1,2 = tR1 + tR2 - \Delta t \qquad \text{Equation GL5}$$

Thus, the equivalent total air time of flight tRLA1, 2 corresponds to the time of flight of the THz transmission beam 20-1 (or 20-2) in the total pipe wall region 6d or as sum of the two pipe walls, provided these share the same refraction index n0=1 or the same speed of light c0 as the surrounding medium, i.e., air.

Th quotient from Equation GL5 and the empty time of flight t0 forms the equivalent path share XL, from which, then with the reference path s0 the equivalent distance sLA can be calculated which is used by the total pipe wall region 6d or the two pipe walls together.

$$xL = tRLA1,2/t0 \qquad \text{Equation GL6}$$

$$sLA = xL * s0 \qquad \text{Equation GL7}$$

Via the distribution of the times of flight, it is calculated from the total distance or accumulated path of the first and second wall thicknesses shares xR1 and xR2:

$$xR1 = tR1/(tR1 + tR2) \text{ and}$$

$$xR2 = tR2/(tR1 + tR2) \qquad \text{Equation GL 8}$$

and, above, as result step St 7, the absolute values for the wall thicknesses sRi $$sR1 = xR1 * sLA \text{ and}$$

$$sR2 = xR2 * sLA \qquad \text{Equation GL9}$$

Accordingly, for step St7 also a total equation GL10 can be determined from:

$$sR1 = tR1 * c0 * (t0 - tL1 - tL2 - tL3)/(tR1 + tR2) \text{ and}$$

$$sR2 = tR2 * c0 * (t0 - tL1 - tL2 - tL3)/(tR1 + tR2) \qquad \text{Equation GL10}$$

which directly describes a determination from the measurement values without the aforementioned intermediate steps.

Thus, according to the invention, determinations of the wall thicknesses sR1, SR2 of the pipe 6 are possible without knowing the refraction index n6.

Accordingly, subsequently, from the interior times of flight tR1 and tR2 and the so determined wall thicknesses or wall thickness refraction values SR1 and SR2, in a step St8, the speed of light C6 in the raw material and therewith also the averaged refraction index n6 can be determined as:

$$n6 = c0/c6 = c0 * ((tR1 + tR2)/(sR1 + sR2)) \qquad \text{Gl11}$$

and, according to the first and second refraction index n6-1 and n6-2 of the first and second wall thickness sR1, sR2, if these are to be viewed separated, as $$n6\text{-}1 = c0/c6\text{-}1 = c0*(tR1/sR1) \qquad \text{Gl11a}$$

$$n6\text{-}2 = c0/c6\text{-}2 = c0*(tR2/sR2) \qquad \text{Gl11a}$$

In this embodiment, instead of a pair or sensors with two THz sensors 1, 2 it is also possible to utilize a single THz sensor 1 and successively adjust it into the two measuring positions MP1, MP2; otherwise, the above remarks apply equally.

In the embodiment involving a calibrating pipe, in the above-described calibration corresponding equations can be used for the calibration measurement: thus, e.g., at an exterior diameter OD_Messrohr of the calibrating pipe, the following can be applied:

$$s_0 = OD_{Messrohr} + c_0(t_{L1} + t_{L2}) \qquad \text{Gl 12}$$

$$s_0 = c_0(t_{L1} + t_{L2} + t_{L3}) + c_R(t_{R1} + t_{R2}) \qquad \text{Gl 13}$$

or the empty time of flight $t_0$ as:

$$t_0 = s_0/c_0 \text{ with the above } s_0\text{-} \qquad \text{equations Gl 14}$$

FIG. 4, 5 shows a THz measuring device 103 according to a second embodiment. Here, at the second measuring position MP2, instead of the second THz sensors 2 a measuring reflector 102 is provided which is aligned perpendicular to the optical axis A of the first THz sensor 1 and, accordingly, reflects back the first THz transmission beam 20-1.

Accordingly, in the calibrating step St1 according to FIG. 4, the use of a measuring reflector 7 is no longer required, but the total time of flight or empty time of flight t0 can be determined directly from the measuring signal SS1 of the first THz sensor 1, from which in turn the empty path s0 can be determined from the known speed of light c0.

Thus, in this embodiment, the THz measuring device 103 is already calibrated by virtue of this empty path measurement or empty measurement so that, again, subsequently a measured object, in this case the pipe 6, can be measured.

Thus, in this embodiment, the first THz transmission beam 20-1 is used when passing through the entire pipe 6 with the corresponding times of flight tL1, tR1, tL2, tR2 and tL3, which can be read out directly in the common measuring signal of the reflected beam; thus, there will be no double measurements or averaged calculation of the interior diameter sL2. Thus, the measuring steps St4, St5 can be carried out in a single measurement or in a combined manner. In principle, the second measuring step St5 may be carried out using the directly emitted first THz beam 20-1, or in the beam reflected on the reflector 102, therewith in the THz beam running leftwards in FIG. 5.

The subsequent determination according to step St6, St7 again happens according to the above equations GL1 through GL11a,b.

Below is an exemplary calculation with measured values when measuring a pipe 6 made of polyethylene according to the first or second embodiment:

Provisional configuration of the measuring values

| | | |
|---|---|---|
| c0 | 299792458 | [m/s] |
| s0 | 1 | [m] |
| t0 | 3.33564E−09 | [s] |
| n6 | 1.59 | [—] |

| wall thicknesses/ distances | | $t_{i\_Luft}$ [s] | $t_{i\_pipe}$ [s] |
|---|---|---|---|
| sL1 | 0.200 | 6.67128E−10 | 6.67128E−10 |
| sR1 | 0.061 | 2.03474E−10 | 3.23524E−10 |
| sL2 | 0.390 | 1.3009E−09 | 1.3009E−09 |
| sR2 | 0.049 | 1.63446E−10 | 2.5988E−10 |
| sL3 | 0.300 | 1.00069E−09 | 1.00069E−09 |
| sum | | 3.33564E−09 | 3.55212E−09 |

| | | |
|---|---|---|
| Δt | 2.16483E−10 | [s] |
| $t_{Rges}$ | 3.55212E−09 | [s] | recalculation—evaluation via evaluated time-of-flight information ti_pipe, t0, s0:

time of flight in the pipe segment as if it were air (equivalent time of flight in the entire pipe wall region 6d)

| | | |
|---|---|---|
| tRA1,2 | 3.66921E−10 | [s] |
| | air share related to the time of flight | |
| xL | 0.110 | [—] |
| | equivalent air path | |
| sLA | 0.110 | [m] |
| | pipe segment shares | |
| $x_{R1}$ | 0.554545455 | [—] |
| $x_{R2}$ | 0.445454545 | [—] |
| | pipe wall thicknesses | |
| $s_{R1}$ | 0.061 | [m] |
| $s_{R2}$ | 0.049 | [m] |

FIG. 6 shows an arrangement for manufacturing and measuring a pipe 6 or pipe profile by means of an extruder 110, to which at least one granulate 111 is fed as source material, a measuring device 3 or 103, and a conveyor device 120 for transporting the pipe 6 along the transport axis B.

Hereby, the granulate 111 may contain various components, or a plurality of source materials 111 may be fed e.g., by a plurality of material feeds, e.g., screw conveyors, which are thereby jointly processed by the extruder.

For all embodiments, further determinations may be carried out:

Because the pipe 6 is continuously transported along its transport axis B through the THz measuring device 3, 103, these values can be continuously calculated. Hereby, changes in the wall thicknesses can be detected; changes of the exterior distances sL1, sL3 may be used for compensation by the conveyor device 120, i.e., the pipe 6 may be adjusted towards the left or the right, or the measuring device 3, 103 may be adjusted relative to the pipe 6.

In particular, the refraction index n6 may also be viewed as a function of time, i.e. n6 (*t*), and the temporal consistency of the so determined refraction index n6 may be checked as to whether it lies within corresponding threshold values GW1, GW2 corresponding to the measuring accuracy and calculating accuracy, to validate that the material batch has not changed and the material mx is homogenous which is of advantage, in particular, when measuring after an extrusion with various components.

In the event that, upon acquiring the measuring values, due to high degrees of deformation and therewith destructive reflection of the measuring signal, a clean evaluation of the time of flight for the internal diameter (compare tL2-1 and tL2-2 in FIG. 3 or tL2 in FIG. 5) should be impossible, then the wall thickness sR1, sR2 can be determined solely by means of the times of flight tR1, R2 within the pipe walls with the last determined refraction index n6. This is based on the assumption that the material composition remains unchanged within short periods of time.

If, e.g., material accumulations should be present only in one wall, the temperature may differ between the left and the right wall. This leads to a change of the first refraction index n6-1 and/or the second refraction index n6-2 as material specific property. This can be put out as additional information to the operator of the installation because the measurement may be not unambiguously valid. All established methods previously assumed in a simplified manner that the refraction index within a cross-section made of a homogenous material is constant.

As described above, a first THz sensor 1 and an opposite measuring mirror 102 or a second THz sensor 2 may be provided.

Furthermore, embodiments are possible including:

An n-fold arrangement of sensors (odd number of sensors, in particular to attain 100% coverage of the circumference or the exterior surface 6a of the pipe 6, where two approximately opposite sensors are used for evaluation. To this end, e.g., a mathematically vectorial adaptation of the measuring values in relation to an axis may be carried out. Hereby, the sensors, depending on its angle of inclination deviating from 180°, will determine progressively deviating measuring values for the time of flight $t_{L2\_1/2}$, because, due to the geometric marginal conditions at the pipe, the time of flight or the internal diameter may vary. This can serve as comparison for the validity of this measurement.

An n-fold arrangement of two opposite sensors (even number of sensors), where each sensor itself is mounted rotationally, and the central position of the pipe is compensated by means of angular adjustment utilizing the measured values. Hereby, it should be observed, in particular, that both sensors may determine progressively deviating measuring values for the time of flight $t_{L2\_1/2}$ depending on their angle of inclination deviating from 180°, because, due to the geometric marginal conditions at the pipe, the time of flight or the internal diameter may vary. This can serve as comparison for the validity of this measurement.

FIGS. 8 and 9 show an embodiment with sensors 1, 2 that pivot in the shown measuring plane E, i.e., the drawing plane. This measuring plane E lies perpendicular to the transport axis B of FIG. 3, whereby, subsequently, the transport axis B corresponds to the center M of the pipe 6. Thus, the measuring plane E is defined by the common optical axis A and a second direction, here, the vertical direction V.

The initial position of the sensors 1, 2 is again the alignment on the common optical axis A, where the sensors 1, 2 can pivot from this initial position in the measuring plane E each by a first adjustment angle α1 and, accordingly, a second adjustment angle α2.

By aligning the two sensors 1 and 2 in the initial position, i.e., on the common optical axis A, according to FIG. 3, again, like in the first embodiment of FIGS. 1, 2, the empty path S0 can be measured in the calibrating step.

Thereafter, the pipe 6 is introduced as measured object the center M of which will generally not lie on the common optical axis A.

In an alignment step, the sensors are swiveled in their measuring positions MP1 and MP2 so that their optical axes A1 and A2 lie perpendicular to the exterior surface 6a of the pipe 6. This can be carried out, e.g., using the method of DE 10 2015 122 105 A1, according to which the sensors 1 and 2 are pivoted in both directions and maximum values of the reflection peaks at the exterior surface 6a indicate the perpendicular alignment.

Thus, according to this representation, it is generally valid for the distances of the measuring positions MP1, MP2 and the center M, with s0 as empty path between MP1 and MP2 as well as
x'=path MP1-M, and y'=path MP2-M $$s0 \neq x' + y'$$

If x designates the projection of x' on the optical axis A, i.e., therewith on the empty path s0, and, accordingly, y designates the projection of y' on the optical axis A, it can be determined:

$$x = x'^* \sin \alpha 1 \text{ and } y = y'^* \sin \alpha 2 \qquad \text{Equation Gl15}$$

Hereby, in principle, the wall paths sR1 and sR2 remain unchanged compared to FIG. 3 because the sensors 1 and 2 have been aligned perpendicular to the exterior surface of the pipe 6. Also, in principle, the half interior paths (sL2-1)/2 and (sL2-2)/2, whose double value is directly measured by the sensors 1 and 2, can be used as valid provided there is an ideal round 6.

However, the exterior paths sL1 and sL3 drawn in FIG. 9 cannot be measured directly, but they can be determined from the measured exterior times of flight or upon multiplication with the speed of light, the corresponding measurement values (sL1)' or (sL3)' of FIG. 9 and the adjustment angles α1 and α2, as $$sL1 = (sL1)'^* \sin \alpha 1 \text{ and } SL3 = (sL3)'^* \sin \alpha 2 \qquad \text{Equation Gl16}$$

Thus, based on this alone, a calculation corresponding to the embodiment of FIG. 3 can be carried out, i.e. with the Equations 1 through 11a, because the values of sL1, sR1, sR2, sL3 can already be determined this way, whereby, preferably, the value (sL2-1)/2+(sL2-2)/2, i.e. the averaging of the first and second measurement, can be used as internal diameter.

A more precise calculation takes into consideration that, in particular in the presence of ovalities, another calculation leads to a better determination of the internal diameter:

sL1 and sL3 are calculated using Equation Gl16.

Further, the paths x and y in FIG. 8 are composed of $$x = sL1 + sR1 + (sL2-1)/2$$

$$y = sL3 + sR2 + (sL2-2)/2 \qquad \text{Equation GL17}$$

Further, it is stated $$x' = x + \Delta x$$

$$y' = y + \Delta y \qquad \text{Equation Gl18}$$

Hereby, x' and y' can be calculated by means of the sine theorem from the measured empty path s0 and the adjustment angles α1 and α2 because these three values in FIG. 8 unambiguously define the triangle MP1, MP2, M.

The results from GI 17 and GI 18 are $$x' = sL1 + sR1 + (sL2-1)/2 + \Delta x$$

$$y' = sL3 + sR2 + (sL2-2)/2 + \Delta y \qquad \text{Equation 19}$$

Thus, this can be used to calculate Δx and Δy.

Thus, in that the refraction index n is determined, it is also possible to deduce a ratio of the material composition of the source materials 111, where a plurality of source materials 111 are used, so that a regulation of the composition can be carried out by measuring the refraction index n and controlling the material feed 112, without e.g., having exact knowledge of the individual feed rates of the material feed 112.

LIST OF REFERENCE NUMERALS

1 THz sensor
2 THz sensor
3, 103 THz measuring device
4 measuring region, i.e. region between the THz sensors 1, 2 or the first THz sensor 1 and the measuring reflector 102
5 housing
6 measured object, pipe
6*a* exterior surface
6*b* interior surface
6*c* interior space of the pipe 6
6*d* pipe wall
7 calibrating reflector, e.g. precision sheet
11, 12 first, second calibration radiation
20-1 first THz transmission beam
20-2 second THz transmission beam
21-1 first THz reflection beam
21-2 second THz reflection beam
100 controller and evaluation device
101 storage for calibration values
102 measuring reflector in FIG. 4, 5
111 source material, e.g., granulate
112 material feed, e.g. hopper or one or more screw conveyors
A optical axis
B transport axis
c0 speed of light in air/vacuum
c6 material specific speed of light
M center point
MP1 measuring position 1
MP2 measuring position 2
n6 refraction index of the material of the pipe wall
SS1 first measuring signal
SS2 second measuring signal
t0 empty time of flight
s0 empty path
t0-1, t0-2 empty path partial times in FIG. 2
tR1 first exterior time of flight (measured)
tL1 first wall time of flight (measured)
sL1 first wall thickness (calculated)
tL2-1 first interior time of flight through the interior space 6*c* (measured)
tL2-2 second interior time of flight through the interior space 6*c* (measured)
tL2 interior time of flight (averaged measured value) through the interior space 6*c*
tL3 second exterior time of flight from the second sensor 2 to the right exterior surface 6*a* (measured)
tR2 second wall time of flight, here, through the right pipe wall region (measured)
tges_R total time of flight, i.e., sum of the times of flight of the THz radiation across the distance s0 in a measurement of the measured object 6
Δt material-time of flight difference or material specific time of flight difference
tRLA1 first (left) equivalent time of flight, describing the theoretical time of flight of the radiation through the first wall region (first wall thickness sR1) in the medium air or surrounding medium
tRLA2 second (right) equivalent time of flight, describing the theoretical time of flight of the radiation through the second wall region (second wall thickness sR2) in the medium air or surrounding medium
tRLA1,2 equivalent total time of flight in the pipe wall region, i.e., the theoretical time of flight of the radiation through both wall regions in the medium air or surrounding medium

The invention claimed is:

1. A THz measuring method for measuring a measured object, the method including
a preparatory step, providing a THz sensor arrangement for emitting and/or reflecting THz transmission beams from at least one first measuring position of a measuring region and from a second measuring position of the measuring region, the measuring positions being separated by an empty path,
a calibrating step, measuring of an empty time of flight of at least one THz transmission beam through the empty path without the measured object and determining the empty path,
positioning a measured object inside the measuring region between the first measuring position and the second measuring position,
carrying out a first THz measurement from the first measuring position using a THz transmission beam along a first optical axis while measuring a first exterior time of flight up to an exterior surface of the measured object, a first wall time of flight through a first wall region of the measured object and an interior time of flight through an interior space of the measured object,
carrying out a second THz measurement from the second measuring position along a second optical axis while measuring a second exterior time of flight between the second measuring position and the exterior surface of the measured object and a second wall time of flight through a second wall region of the measured object,
determining a total time of flight through the measuring region with the measured object, and
determining a first wall thickness of the first wall region and a second wall thickness of the second wall region from the measured times of flight,
wherein the first THz transmission beam emitted from the first measuring position and the second THz transmission beam emitted from the second measuring position are emitted at different times and in different frequency ranges, and/or in different polarity, so as to avoid mutual interference of the two THz transmission beams.

2. The THz measuring method of claim 1, wherein the determination of the wall thicknesses is carried out without using a material specific value of the measured object without a refraction index or a material specific speed of light.

3. The THz measuring method of claim 1, wherein subsequently, from the determination of the wall thicknesses and the wall times of flight a material specific optical value of the material of the measured object.

4. The THz measuring method of claim 1, wherein the THz sensor arrangement comprises at least two THz sensors arranged around the measuring region at the measuring positions, emitting the at least two THz transmission beams, and carrying out the at least two THz measurements.

5. The THz measuring method of claim 4, wherein the THz sensor arrangement comprises THz-sensors received pivotably in their measuring positions lying, in an initial position, on a common optical axis and being respectively adjusted from this initial position thereby producing an adjustment angle between their optical axes, where the THz-sensors are pivoted away from the initial position subsequent to the calibrating step and/or prior to some of the THz measurements.

6. The THz measuring method of claim 1, wherein the THz sensor arrangement comprises one or more THz sensors rotating continuously around the measuring region, the sensor or sensors carrying out the THz measurements at the measuring positions during such rotation to create helically circumferential, overlapping measurements at the exterior circumference of the measured object so as to completely measure the measured object.

7. The THz measuring method of claim 6, wherein the THz sensor arrangement comprises at least two THz sensors distributed around the measuring region, and jointly rotating, so as to carry out the THz measurements at different times at opposite measuring positions.

8. The THz measuring method of claim 1, wherein, in the calibrating step for measuring the empty time of flight, a calibrating reflector with reflective surfaces on both sides and a known reference thickness is introduced in-between the first measuring position and the second measuring position, from each measuring position, an empty partial time of flight up to one of the reflective surfaces is measured, and subsequently, from the so determined empty partial times of flight, the known speed of light as well as the known reference thickness the empty time of flight and the empty path are determined.

9. The THz measuring method of claim 1, wherein in the calibrating step for measuring the empty time of flight a calibration object transparent for THz radiation is introduced in-between first measuring position and the second measuring position, from both measuring positions each an empty partial time of flight up to boundary surfaces of the calibration object is measured, and subsequently, from the so determined empty partial times of flight, the known speed of light as well as the known reference thickness the empty time of flight and the empty path are determined.

10. The THz measuring method of claim 1, wherein the THz sensors in the first and second measuring positions lie on a common optical axis.

11. The THz measuring method of claim 9, wherein from the interior times of flight of the interior space of the measured object measured from the first measuring position and the second measuring position and/or measured interior times of flight of the calibration object, an averaging is carried out so as to determine an average and/or a comparison to validate the measured interior times of flight.

12. The THz measuring method of claim 1, wherein, in the preparatory step, at the first measuring position a first THz sensor is arranged and at the second measuring position a measuring reflector is arranged, the measuring reflector reflecting the first THz transmission beam, emitted from the first THz sensor and coming in along the first optical axis, back to the first THz sensor, where, as the calibrating step, a direct measurement of the empty time of flight of the empty path is carried out by means of the first THz sensor, and in the measurements of the measured object, all times of flight are measured by the first THz sensor, with and/or without reflection at the measuring reflector.

13. The THz measuring method of claim 1, wherein the determination of the total time of flight through the measuring region is carried out via a summation of the first and second exterior times of flight, the two wall times of flight, and an interior time of flight.

14. The THz measuring method of claim 1, wherein the first and/or second wall thickness are determined according to the following formula:

$$sR1 = tR1 * c0 * (t0 - tL1 - tL2 - tL3)/(tR1 + tR2) \text{ and}$$

$$sR2 = tR2 * c0 * (t0 - tL1 - tL2 - tL3)/(tR1 + tR2)$$

with the following variables:

$sR1$: first wall thickness, $sR2$: second wall thickness, $tR1$: first wall time of flight, $tR2$: second wall time of flight, $c0$: speed of light in a vacuum or gas of the measuring region, $t0$: empty time of flight of the calibration step, $tL1$: first exterior time of flight, $tL3$: second exterior time of flight, and $tL2$: interior time of flight.

15. The THz measuring method of claim 1, wherein the measured object is continuously transported through the measuring region perpendicular to the optical axis, and the wall thicknesses are continuously determined.

16. The THz measuring method of claim 15, wherein the wall thicknesses are continuously temporally acquired and compared to one another to determine temporal changes of the wall thicknesses and/or a temporal change of the material composition from a temporal change of the refraction index.

17. The THz measuring method of claim 1, wherein upon detecting that reflections at the interior surface for measuring the wall times of flight and/or the interior time of flight are not or not accurately determined from the measuring signals, a destructive reflection of the THz transmission beam is inferred, and the wall thicknesses are determined from the total time of flight within the pipe walls with the last determined refraction index.

18. The THz measuring method of claim 1, wherein the at least one THz transmission beam is emitted as terahertz radiation, microwave radiation or radar radiation in a frequency range between 5 GHz and 50 THz.

19. A THz measuring device for measuring a measured object comprising:

a THz sensor arrangement including at least one first THz sensor, the THz sensor arrangement adapted to carry out at least one first THz measurement at a first measuring position by emitting a first THz transmission beam and receiving first reflected radiation and one second THz measurement at a second measuring position by emitting a second THz transmission beam and receiving second reflected radiation, the first and second measuring positions being separated by an empty path; and a controller and evaluating device for controlling the sensor arrangement and receiving at least one measuring signal of the sensor arrangement, said controller and evaluating device being configured to determine, from the at least one measuring signal:

during a calibration, the empty path, from an empty time of flight of the at least one THz transmission beam through the empty path without a measured object, and a total time of flight of the at least one THz transmission beam through a measured object introduced into the empty path from (1) a first and second exterior time of flight of the at least one THz transmission beam between the measuring positions and an exterior surface of a measured object, (2) a first and second wall time of flight of the at least one THz transmission beam in a first wall region and a second wall region of the measured object and (3) an interior time of flight of the at least one THz transmission beam in an interior space of the measured object, and from the determined times of flight and the speed of light in the empty path, a first wall thickness of the first wall region, and a second wall thickness of the second wall region of the measured object introduced in the empty path, wherein the THz sensor arrangement is configured to emit the first THz transmission and the second THz transmission beam at different times and in different frequency ranges, and/or in different polarity, so as to avoid mutual interference of the two THz transmission beams.

20. The THz measuring device of claim 19, wherein the THz sensor arrangement comprises: a first THz sensor statically arranged at the first measuring position for emitting the first THz transmission beam along an optical axis into the measuring region, and a second THz sensor statically arranged at the second measuring position for emitting the second THz transmission beam along the optical axis into the measuring region.

21. The THz measuring device of claim 19, wherein the THz sensor arrangement comprises: one or more THz sensors and an adjusting means for partially or continuously circling the measuring region and for positioning into at least the first and second measuring position.

22. The THz measuring device of claim 19, wherein the THz sensor arrangement comprises: the first THz sensor arranged at the first measuring position for emitting the first THz transmission beam along an optical axis into the measuring region and a measuring reflector arranged at the second measuring position for reflecting the THz transmission beam, emitted from the first THz sensor along the optical axis, back to the first THz sensor.

23. The THz measuring device of claim 19, wherein the THz measuring device comprises a plurality of THz sensors arranged around the measuring region, statically or rotating.

24. The THz measuring device of claim 19, wherein the THz measuring device further comprises a conveyor device for continuously guiding and/or transporting the measured object through the measuring region along a transport axis perpendicular to the at least one optical axis.

25. An arrangement for manufacturing an extrusion profile including an extruder for putting out an extrusion profile, comprising at least one material feed, designed to feed at least one source material to the extruder, and the THz measuring device of claim 24 including the conveyor device for conveying the extrusion profile as the measured object through the measuring region, the controller and evaluation device being configured to determine temporal changes in a material composition and/or material distribution of the pipe profile and to put out an indicator signal and/or control signal for controlling the extruder and/or its material feed.

26. The arrangement of claim 25, the material feed being adapted to feed to the extruder several different source materials, and the controller and evaluation device being adapted to determine a current material composition of the source materials from a currently determined refraction index of the extrusion profile.

27. A THz measuring method for measuring a measured object, the method including a preparatory step, providing a THz sensor arrangement for emitting and/or reflecting THz transmission beams from at least one first measuring position of a measuring region and from a second measuring position of the measuring region, the measuring positions being separated by an empty path, a calibrating step, measuring of an empty time of flight of at least one THz transmission beam through the empty path without the measured object and determining the empty path, positioning a measured object inside the measuring region between the first measuring position and the second measuring position, carrying out a first THz measurement from the first measuring position using a THz transmission beam along a first optical axis while measuring a first exterior time of flight up to an exterior surface of the measured object, a first wall time of flight through a first wall region of the measured object and an interior time of flight through an interior space of the measured object, carrying out a second THz measurement from the second measuring position along a second optical axis while measuring a second exterior time of flight between the second measuring position and the exterior surface of the measured object and a second wall time of flight through a second wall region of the measured object, determining a total time of flight through the measuring region with the measured object, and determining a first wall thickness of the first wall region and a second wall thickness of the second wall region from the measured times of flight, wherein the THz sensor arrangement comprises at least two THz sensors arranged around the measuring region at the measuring positions, emitting the at least two THz transmission beams, and carrying out the at least two THz measurements, and wherein the THz sensor arrangement comprises THz-sensors received pivotably in their measuring positions lying, in an initial position, on a common optical axis and being respectively pivoted in their measuring positions from this initial position to an adjusted position thereby producing an adjustment angle formed between a respective optical axis of each THz-sensor in the adjusted position and their common optical axis axes, where the THz-sensors are pivoted away from the initial position subsequent to the calibrating step and/or prior to some of the THz measurements.

* * * * *